(12) United States Patent
Shin et al.

(10) Patent No.: US 12,469,922 B2
(45) Date of Patent: Nov. 11, 2025

(54) BATTERY MODULE, BATTERY PACK, AND VEHICLE

(71) Applicant: LG ENERGY SOLUTION, LTD., Seoul (KR)

(72) Inventors: Eun-Gyu Shin, Daejeon (KR); Seung-Hyun Kim, Daejeon (KR); Jae-Min Yoo, Daejeon (KR); Young-Seok Lee, Daejeon (KR); Jeong-O Mun, Daejeon (KR); Yoon-Koo Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 929 days.

(21) Appl. No.: 17/628,703

(22) PCT Filed: Aug. 20, 2020

(86) PCT No.: PCT/KR2020/011127
§ 371 (c)(1),
(2) Date: Jan. 20, 2022

(87) PCT Pub. No.: WO2021/107336
PCT Pub. Date: Jun. 3, 2021

(65) Prior Publication Data
US 2022/0271387 A1    Aug. 25, 2022

(30) Foreign Application Priority Data
Nov. 25, 2019    (KR) .................. 10-2019-0152649

(51) Int. Cl.
*H01M 50/30* (2021.01)
*H01M 50/24* (2021.01)
*H01M 50/383* (2021.01)

(52) U.S. Cl.
CPC ........... *H01M 50/30* (2021.01); *H01M 50/24* (2021.01); *H01M 50/383* (2021.01); *H01M 2220/20* (2013.01)

(58) Field of Classification Search
CPC ....... H01M 50/24; H01M 50/204–249; H01M 50/30; H01M 50/375–394;
(Continued)

(56) References Cited

U.S. PATENT DOCUMENTS 5,441,123 A    8/1995  Beckley
2005/0253553 A1    11/2005  Phillips et al.
(Continued)

FOREIGN PATENT DOCUMENTS

CN    202327096 U    7/2012
CN    202327099 U    7/2012
(Continued)

OTHER PUBLICATIONS

"Morioka, JP201837181 A EPO machine translation, 2018" (Year: 2018).*
(Continued)

*Primary Examiner* — Jonathan G Leong
*Assistant Examiner* — Kan Luo
(74) *Attorney, Agent, or Firm* — Birch, Stewart, Kolasch & Birch, LLP (57) ABSTRACT

A battery module includes a cell assembly having at least two battery cells; a module housing having an inner space accommodating the cell assembly, and including a circulation hole so that the inner space is connected to an outside; a mesh member having a mesh structure and provided in the circulation hole of the module housing; and a sealing member provided at a position facing the mesh member and configured to expand a volume at more than a predetermined temperature to seal a mesh hole of the mesh member.

8 Claims, 11 Drawing Sheets

(58) Field of Classification Search
CPC ........... H01M 10/613; H01M 2200/10; H01M 2220/20; H01M 50/383; Y02E 60/10
See application file for complete search history.

(56) References Cited

U.S. PATENT DOCUMENTS

| | | |
|---|---|---|
| 2009/0197153 A1 | 8/2009 | Fujikawa |
| 2014/0186677 A1 | 7/2014 | Lim |
| 2018/0026245 A1 | 1/2018 | Page et al. |
| 2018/0183117 A1 | 6/2018 | Cho et al. |
| 2019/0097192 A1 | 3/2019 | Kim et al. |
| 2019/0267684 A1 | 8/2019 | Ryu et al. |

FOREIGN PATENT DOCUMENTS

| | | | |
|---|---|---|---|
| JP | 57-50973 U | 3/1982 | |
| JP | 7-57709 A | 8/1995 | |
| JP | 2003-328470 A | 11/2003 | |
| JP | 2009-212081 A | 9/2009 | |
| JP | 2010-55908 A | 3/2010 | |
| JP | 2013-196908 A | 9/2013 | |
| JP | 2013-246920 A | 12/2013 | |
| JP | 2015-153616 A | 8/2015 | |
| JP | 2016-201333 A | 12/2016 | |
| JP | 201837181 A | * 3/2018 | ............. H01M 2/10 |
| JP | 2018-206605 A | 12/2018 | |
| KR | 10-2014-0089067 A | 7/2014 | |
| KR | 10-1564622 B1 | 11/2015 | |
| KR | 10-2017-0029283 A | 3/2017 | |
| KR | 10-2018-0106687 A | 10/2018 | |
| KR | 10-2019-0035580 A | 4/2019 | |
| KR | 10-2019-0036260 A | 4/2019 | |
| KR | 10-2006412 B1 | 8/2019 | |
| TW | M559342 U | 5/2018 | |

OTHER PUBLICATIONS

International Search Report (PCT/ISA/210) issued in PCT/KR2020/011127 mailed on Dec. 1, 2020.

* cited by examiner

BATTERY MODULE, BATTERY PACK, AND VEHICLE

TECHNICAL FIELD

The present disclosure relates to a battery module, and more particularly, to a battery module with improved safety with respect to a fire or thermal runaway.

The present application claims priority to Korean Patent Application No. 10-2019-0152649 filed on Nov. 25, 2019 in the Republic of Korea, the disclosures of which are incorporated herein by reference.

BACKGROUND ART

Currently commercialized secondary batteries include nickel cadmium batteries, nickel hydrogen batteries, nickel zinc batteries, lithium secondary batteries, and the like. Among these secondary batteries, because lithium secondary batteries have almost no memory effect compared to nickel-based secondary batteries, lithium secondary batteries are in the spotlight owing to the advantages of free charge and discharge, very low self discharge rate, and high energy density.

These secondary batteries have high applicability to various product lines and have electrical characteristics with high energy density. Such secondary batteries are applied not only to portable electronic devices, but also to electric vehicles or hybrid vehicles driven by an electric drive source, and energy storage devices.

Secondary batteries are attracting attention as a new energy source for eco-friendliness and energy efficiency improvement in that the secondary batteries do not generate by-products from the use of energy as well as the primary advantage of being able to drastically reduce the use of fossil fuels.

A battery pack applied to an electric vehicle has a structure in which a plurality of battery modules including a plurality of battery cells are connected to obtain high output. In addition, each battery cell is an electrode assembly and is able to be repeatedly charged and discharged by an electrochemical reaction between components, including positive and negative current collectors, separators, active materials, and electrolytes.

Meanwhile, as the need for a large-capacity structure, including utilization as an energy storage source, is increasing in recent years, the demand for a plurality of battery modules in which a plurality of secondary batteries are connected in series and/or in parallel is increasing.

In such a battery module, because a plurality of battery cells (secondary cells) are provided in a compact form in a narrow space of the module housing, when a fire or thermal runaway occurs in some battery cells, fire or thermal runaway rapidly spreads to adjacent battery cells. In order to prevent spread, it was important to quickly discharge high temperature gas or flame generated from each battery cell to the outside.

In addition, in the battery module of the related art, it is easy to accumulate heat generated by charging and discharging a plurality of battery cells inside, and to reduce the accumulation of heat, the battery module is often configured to have external air introduced into the inside and internal air discharged to the outside for cooling.

However, even when fire occurs in a plurality of battery cells, because external air may continuously flow into the battery module, oxygen supply becomes smooth, and thus there is a serious problem that fire further increases, and fire spreads to the surrounding battery cells.

DISCLOSURE

Technical Problems

The present disclosure is designed to solve the problems of the related art, and therefore the present disclosure is directed to providing a battery module with improved safety with respect to a fire or thermal runaway.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module including a cell assembly including at least two battery cells, a module housing including an inner space accommodating the cell assembly, and including a circulation hole so that the inner space is connected to an outside, a mesh member having a mesh structure and provided in the circulation hole of the module housing, and a sealing member facing the mesh member and configured to expand a volume at more than a predetermined temperature to seal a mesh hole of the mesh member.

The sealing member may include a plurality of vent holes to discharge a gas generated inside the module housing to the outside.

The module housing may include at least two fixing members configured to fix the mesh member to the circulation hole.

The mesh member may be interposed between the at least two fixing members.

Each of the at least two fixing members may include an opening hole configured to insert the sealing member therein.

The sealing member may be configured to generate a carbonization layer that expands a volume at more than a predetermined temperature.

The mesh member may include a stopper configured to stop the carbonization layer from moving in a direction toward the mesh member.

The sealing member may include a core unit positioned in each of the plurality of vent holes and configured to expand a volume at more than a predetermined temperature to seal the vent hole and the mesh member.

The battery module may further include: a discharge member provided outside the sealing member, spaced apart from the sealing member by a predetermined distance, and including a plurality of discharge holes to discharge the gas to the outside.

A pillar portion protruding in an outward direction may be provided on an outer surface of the discharge member, the pillar portion being configured to expand a volume at more than a predetermined temperature to seal the plurality of vent hole of the sealing member.

At least two battery cells of the cell assembly may be stacked in a first direction.

The cell assembly may include an elastic member provided between the at least two stacked battery cells and the module housing to buffer a volume change of the cell assembly.

In another aspect of the present disclosure, there is provided a battery pack including the at least one battery module.

In another aspect of the present disclosure, there is provided a vehicle including the battery pack.

Advantageous Effects

According to an aspect of the present disclosure, the present disclosure includes a sealing member configured to seal a mesh member provided in a circulation hole of a module housing by expanding a volume at more than a predetermined temperature, and thus when a fire or thermal runaway of a cell assembly occurs, the volume of the sealing member expands by a high temperature gas, and the sealing member of the expanded volume may seal the mesh member, and thus external air may be no longer introduced into the module housing. Accordingly, the module housing sealed against the outside may prevent the fire of the cell assembly from further spreading, and ultimately induce the fire to naturally extinguish.

In addition, according to an aspect of the present disclosure, a sealing member includes a plurality of vent holes perforated to discharge gas generated inside a module housing to the outside, and thus when a fire or thermal runaway occurs in the cell assembly, the high temperature gas may be initially discharged to the outside through the plurality of vent holes of the sealing member. Accordingly, a battery module of the present disclosure may rapidly discharge the high temperature gas to prevent the internal temperature of the module housing from rapidly rising, thereby preventing a fire or thermal runaway of an adjacent battery cell from spreading.

Then, thereafter, while the volume of the sealing member expands by the high temperature gas, the plurality of vent holes may be sealed. Accordingly, external air may not be introduced into the vent holes of the sealing member, and thus external air may be no longer introduced into the module housing. Accordingly, the module housing sealed against the outside may prevent the fire of the cell assembly from further spreading, and ultimately induce the fire to naturally extinguish.

In addition, according to an aspect of the present disclosure, a module housing includes an upper plate including a bent portion in which an outer peripheral portion is bent at least two times, and a lower case having a box shape with an open top, an upper end portion coupled to the upper plate and having a structure bent at least two times so as to correspond to an outer surface of the bent portion, thereby achieving a tightly sealed structure between the upper plate and the lower case of the module housing. Accordingly, the battery module does not leak out a high temperature gas generated therein, thereby increasing user safety.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
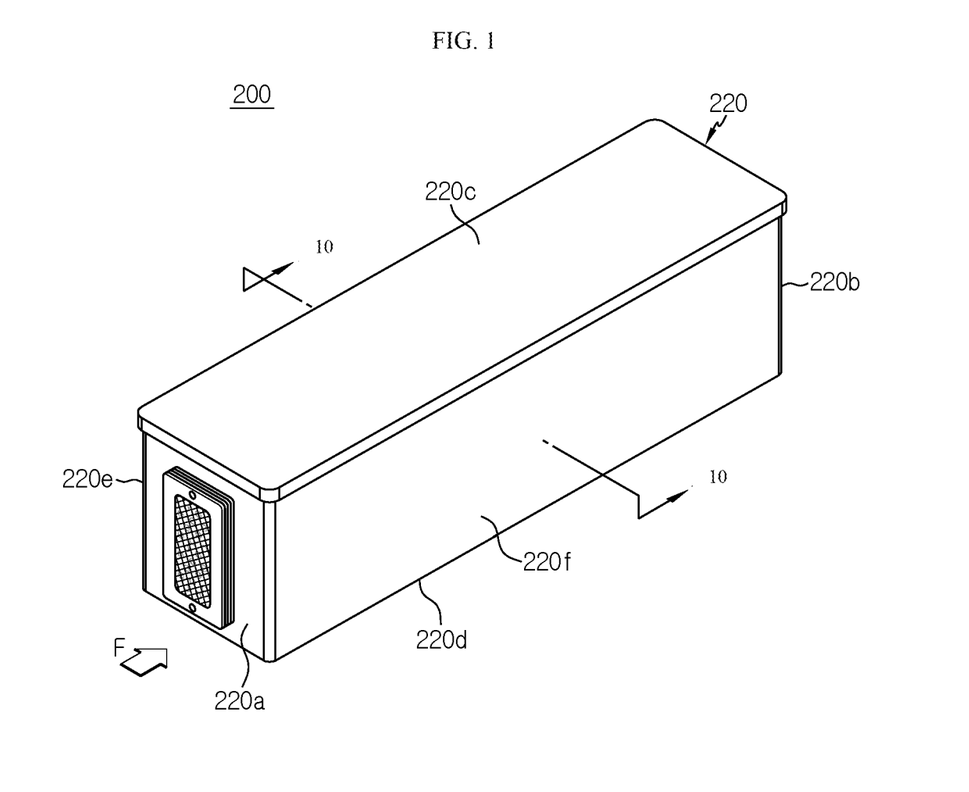
FIG. 1 is a perspective view schematically showing a battery module according to an embodiment of the present disclosure.
Figure 2:
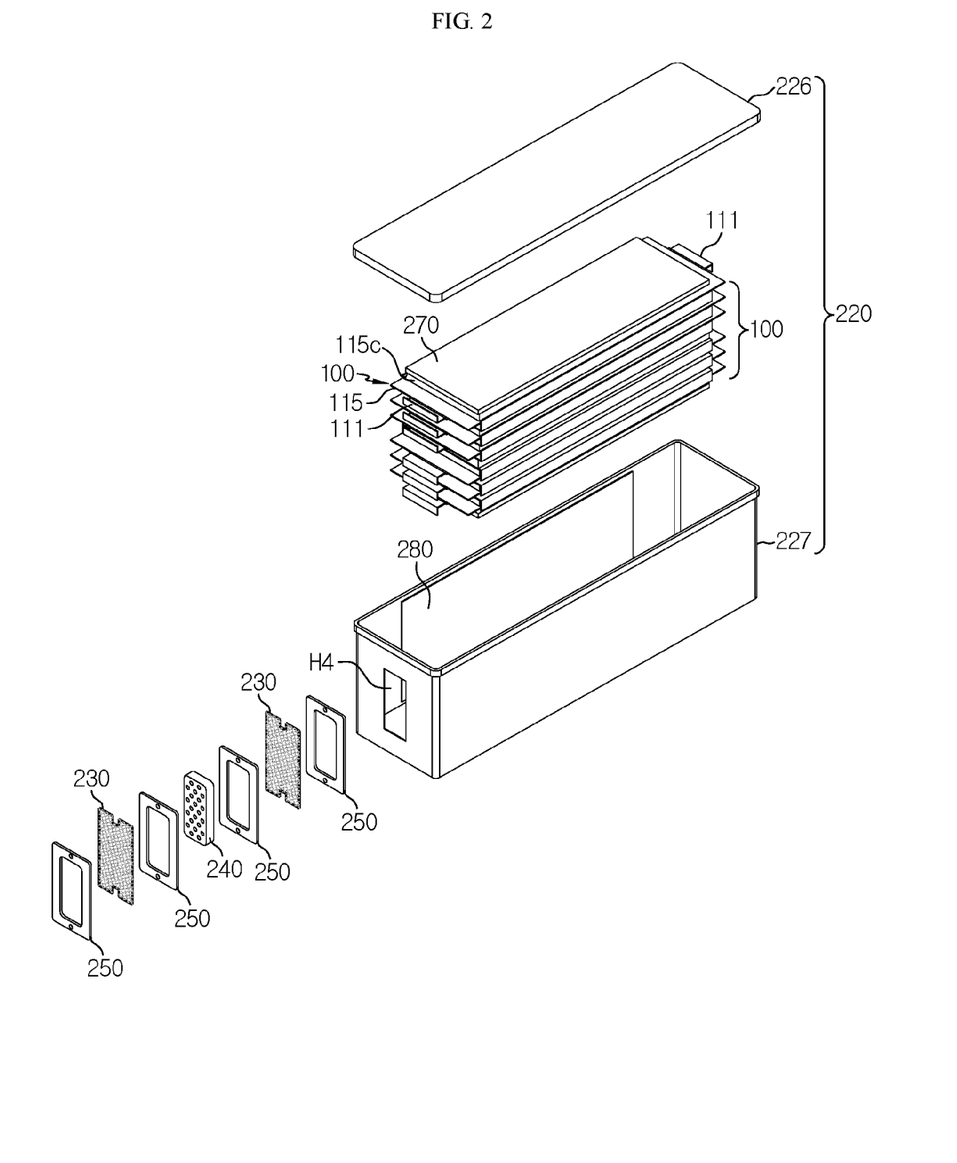
FIG. 2 is an exploded perspective view schematically showing configurations of a battery module according to an embodiment of the present disclosure.
Figure 3:
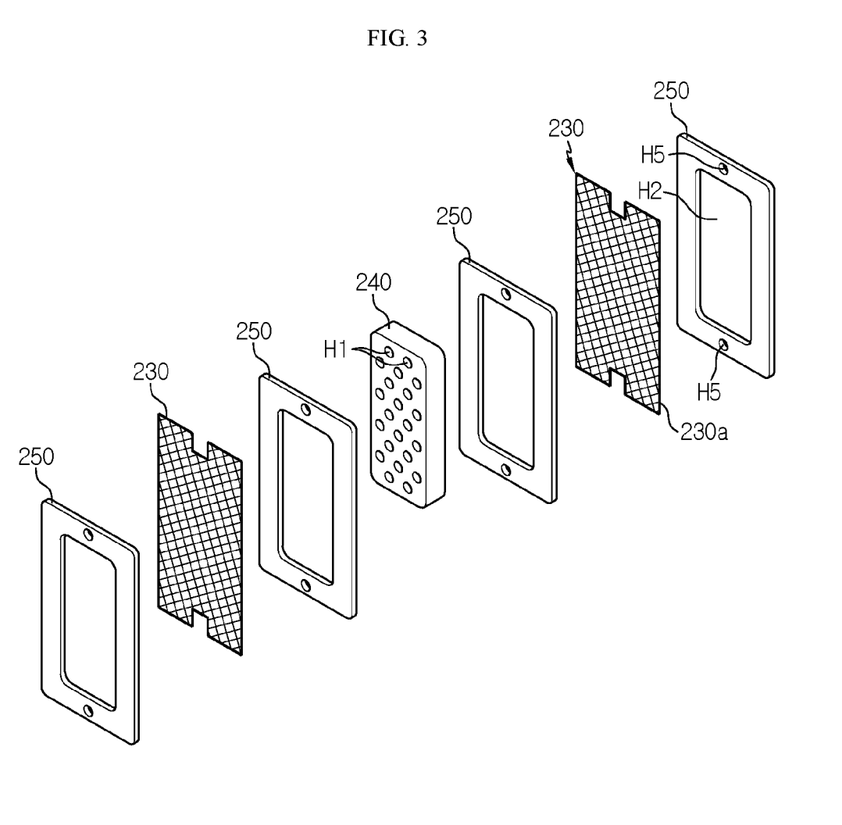
FIG. 3 is an exploded perspective view schematically showing some configurations of the battery module according to an embodiment of the present disclosure.

FIG. 1 is a perspective view schematically showing a battery module according to an embodiment of the present disclosure. FIG. 2 is an exploded perspective view schematically showing configurations of a battery module according to an embodiment of the present disclosure. FIG. 3 is an exploded perspective view schematically showing some configurations of the battery module according to an embodiment of the present disclosure.

Referring to FIGS. 1 to 3, a battery module 200 according to an embodiment of the present disclosure includes a cell assembly 100, a module housing 220, a mesh member 230, and a sealing member 240.

Here, the cell assembly 100 may include at least two battery cells 110. In addition, the battery cell 110 may be a pouch type battery cell 110. In particular, the pouch type battery cell 110 may include an electrode assembly (not shown), an electrolyte (not shown), and a pouch outer case 115.

Here, the electrode assembly may be configured in a form in which one or more positive electrode plates and one or more negative electrode plates are arranged with a separator therebetween. More specifically, electrode assemblies may be divided into a winding type in which one positive electrode plate and one negative electrode plate are wound together with a separator, and a stack type in which a plurality of positive electrode plates and a plurality of negative electrode plates are alternately stacked with a separator interposed therebetween.

In addition, the pouch outer case 115 may be configured to include an outer insulating layer, a metal layer, and an inner adhesive layer. The pouch outer case 115 may be configured to include a metal thin film, such as an aluminum thin film, to protect internal components such as an electrode assembly and an electrolyte, to supplement electrochemical properties by the electrode assembly and the electrolyte, and to improve heat dissipation. In addition, this aluminum thin film may be interposed between insulating layers formed of an insulating material in order to secure electrical insulation with components inside the battery cell 110 such as the electrode assembly and the electrolyte or other components outside the battery cell 110.

In particular, the pouch outer case 115 may include two pouches. A concave inner space may be formed in at least one of the two pouches. In addition, the electrode assembly may be accommodated in the inner space of the pouch. In addition, sealing portions are provided on outer circumferential surfaces of the two pouches so that the sealing portions are fused to each other, and thus the inner space in which the electrode assembly is accommodated may be sealed. That is, an accommodation portion 115c in which the electrode assembly and the electrolyte are accommodated may be formed in the outer case 115.

Each pouch type battery cell 110 may include electrode leads 111 respectively on both ends in a front and rear direction. The electrode leads 111 may be positive or negative electrode leads according to electrical polarity.

More specifically, the electrode lead 111 may be configured to protrude forward or rearward from the sealing portion located on an outer circumferential surface of the front or rear of the pouch case 115. In addition, such an electrode lead 111 may function as an electrode terminal of the batter cell 110. For example, as shown in FIG. 2, one electrode lead 111 may be configured to protrude forward from the battery cell 110, and the other electrode lead 111 may be configured to protrude rearward from the battery cell 110.

Therefore, according to this configuration of the present disclosure, there is no interference between the positive electrode lead and the negative electrode lead in one battery cell 110, and thus an area of the electrode lead 111 may increase, and a welding process between the plurality of electrode leads 111 or between the electrode lead 111 and a bus bar (not shown), etc. may be more easily performed.

In addition, a plurality of pouch type battery cells 110 may be included in the battery module 200 and arranged to be stacked in at least one direction. For example, as shown in FIG. 2, the plurality of pouch type battery cells 110 may be stacked in a vertical direction. At this time, each pouch type battery cell 110 may be laid approximately horizontally on the ground so that two wide surfaces are respectively located on left and right sides, and the sealing portions are located on the left, right, front and rear sides when viewed in the F direction.

Meanwhile, terms representing directions such as before, after, left, right, up, and down described in the present specification may vary depending on the position of an observer or the shape of an object that is placed. However, in the present specification, for convenience of description, the directions such as front, rear, left, right, up, and down are indicated separately based on when viewed in the F direction.

The configuration of the pouch type battery cell 110 described above is obvious to those skilled in the art to which the present disclosure belongs, and thus a more detailed description will be omitted. In addition, in the cell assembly 100 according to the present disclosure, various battery cells (secondary batteries) known at the time of filing of the present application may be employed.

Meanwhile, the battery module 200 may further include a bus bar (not shown) electrically connecting two or more battery cells 110 of the cell assembly 100. The busbar may include a conductive metal to electrically connect the plurality of battery cells 110. For example, the conductive metal may be copper, copper alloy, aluminum, aluminum alloy, or nickel.

Referring back to FIGS. 1 and 2, in the battery module 200, the module housing 220 may protect an internal configuration from an external impact or prevent an external material from being introduced. Accordingly, the module housing 220 may provide structural stability to the battery module 200 and protect components accommodated inside such as the cell assembly 100 from other external physical elements such as impacts or substances. To this end, the module housing 220 may include a metal material such as steel or aluminum.

In particular, when the module housing 220 includes the metal material including aluminum, the module housing 220 may effectively discharge heat generated from the cell assembly 100 to the outside of the module housing 220 by using the high thermal conductivity of aluminum. For example, when viewed in the F direction, the module housing 220 may include a front side wall 220a, a rear side wall 220b, an upper side wall 220c, a lower side wall 220d, a left side wall 220e, and a right side wall 220f with respect to the cell assembly 100.

In addition, the module housing 220 may include an inner space defined by the sidewall to accommodate the cell assembly 100. Specifically, the inner space may have an internal structure corresponding to an external shape of the cell assembly 100.

For example, as shown in FIG. 2, the module housing 220 may have a structure in which the front side wall 220a, the rear side wall 220b, the upper side wall 220c, the lower side wall 220d, the left side wall 220e, and the right side wall 220f of the module housing 220 are be connected to form a right angle to each other so as to accommodate the cell assembly 100 in a rectangular parallelepiped in an approximate overall shape.

Meanwhile, the module housing 220 may include a circulation hole H4 so that the inner space is connected to the outside. The circulation hole H4 may be provided in the front side wall 220a of the module housing 220 in a perforated form. The circulation hole H4 may be configured to discharge gas generated from the inside to the outside, or to allow external cooled air to be introduced into the module housing 220. For example, a cooling fan (not shown)

configured to inject external air into the module housing 220 may be provided on the outside of the circulation hole H4.

In addition, the mesh member 230 may include the circulation hole H4 of the module housing 220. The mesh member 230 may have a mesh structure. The size of a mesh eye may range from 0.5 mm to 2 mm. The mesh member 230 may include a wire 230a connected to the mesh structure on its edge. The mesh member 230 may be configured to make the gas discharged from the circulation hole H4 pass therethrough. Alternatively, the mesh member 230 may function as a filter to filter out foreign substances before external air is introduced into the circulation hole H4 of the module housing 220.

For example, as shown in FIG. 2, the battery module 200 includes two mesh members 230 outside the circulation hole H4 of the module housing 220.

Moreover, the sealing member 240 may be provided at a position facing the mesh member 230. For example, as shown in FIG. 2, the sealing member 240 may be interposed between the two mesh members 230. That is, the sealing member 240 may be positioned so as to be in close contact with one surface of the two mesh members 230.

In addition, the sealing member 240 may be configured to expand a volume at more than a predetermined temperature to seal a mesh hole of the mesh member 230. For example, the predetermined temperature may be 200 degrees Celsius or higher. In addition, the sealing member 240 may prevent flame, smoke, and gas of high heat from leaking out. The sealing member 240 may be easily deformed and have elasticity capable of returning to its original shape.

Moreover, the sealing member 240 may have thermal insulation so that the module housing 220 may be insulated. At least a part of the sealing member 240 may be, for example, a material of FS1000 product of Saint-Gobain. Alternatively, the sealing member 240 may include a graphite flake that expands a volume at more than a predetermined temperature.

Figure 4:
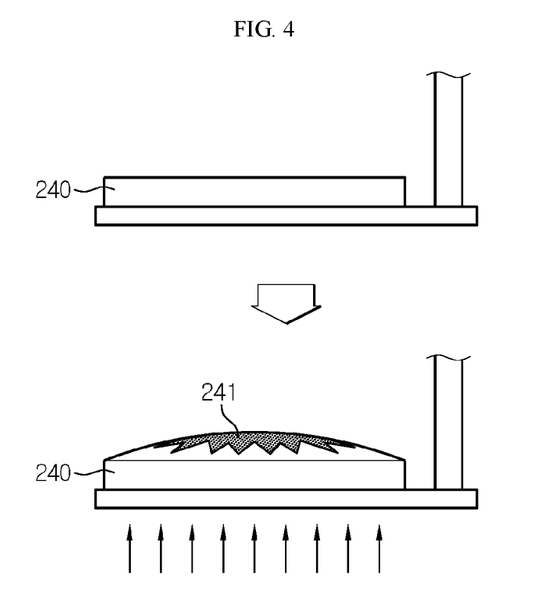
FIG. 4 is a schematic diagram showing the volume expansion of a material of a sealing member applied to a battery module according to an embodiment of the present disclosure.

FIG. 4 is a schematic diagram showing the volume expansion of a material of a sealing member applied to a battery module according to an embodiment of the present disclosure.

Referring to FIG. 4, at least a part of the sealing member 240 may be configured to generate a carbonization layer 241 that expands a volume at more than a predetermined temperature. The carbonization layer 241 may be a layer in which at least a part of the sealing member 240 is carbonized to expand a volume. For example, as shown in FIG. 4, when a central portion of the sealing member 240 is heated to 200 or higher degrees Celsius, the central portion may be carbonized to cause volume expansion, and the carbonized layer 241 may be generated.

Therefore, according to this configuration of the present disclosure, the present disclosure includes the sealing member 240 configured to seal the mesh member 230 provided in the circulation hole H4 of the module housing 220 by expanding a volume at more than a predetermined temperature, and thus, when a fire or thermal runaway occurs in the cell assembly 100, the volume of the sealing member 240 expands by a high temperature gas, and the sealing member 240 of the expanded volume may seal the mesh member 230, and thus external air may be no longer introduced into the module housing 220. Accordingly, the module housing 220 sealed against the outside may prevent the fire of the cell assembly 100 from further spreading and may ultimately induce the fire to naturally extinguish.

Referring back to FIG. 3, the sealing member 240 may include a plurality of perforated vent holes H1. The vent hole H1 may be configured to discharge gas generated inside the module housing 220 to the outside. Alternatively, the vent hole H1 may pass so that external air is introduced into the module housing 220. For example, as shown in FIG. 3, twenty-two vent holes H1 may be perforated and formed in the sealing member 240 in the front and rear direction.

In addition, the sealing member 240 may expand a volume at more than a predetermined temperature to seal the plurality of vent holes H1. Here, the predetermined temperature may be 200 degrees Celsius or higher.

Accordingly, according to this configuration of the present disclosure, the sealing member 240 includes the plurality of vent holes H1 perforated to discharge the gas generated inside the module housing 220 to the outside, and thus when a fire or thermal runaway of the cell assembly 100 occurs, the high temperature gas may initially be discharged to the outside through the plurality of vent holes H1 of the sealing member 240. Accordingly, the battery module 200 of the present disclosure may rapidly discharge the high temperature gas to prevent the internal temperature of the module housing 220 from rapidly rising, thereby preventing the fire or thermal runaway of the adjacent battery cell 100 from spreading.

In addition, thereafter, while the sealing member 240 expands a volume by the high temperature gas, the plurality of vent holes H1 may be sealed. Accordingly, external air may not be introduced into the vent hole H1 of the sealing member 240 so that the external air may be no longer introduced into the module housing 220. Accordingly, the module housing 220 sealed against the outside may prevent the fire of the cell assembly 100 from further spreading and may ultimately induce the fire to naturally extinguish.

Further, referring again to FIGS. 2 and 3, the module housing 220 may include at least two fixing members 250 configured to fix the mesh member 230 to the circulation hole H4. The fixing member 250 may have a plate body extending vertically and horizontally.

In addition, an opened opening hole H2 may be formed in the center of the plate body of the fixing member 250 such that external air may circulate. For example, the opening hole 112 of the fixing member 250 may have a size corresponding to the size of the circulation hole H4. Fastening holes H5 may be respectively formed in upper and lower ends of the fixing member 250 to be bolted to the module housing 220. The sealing member 240 may be inserted into the opened opening holes H2 of the two or more fixing members 250. For example, as shown in FIG. 1, the sealing member 240 may be inserted into and positioned in the opened opening holes H2 of four fixing members 250.

The mesh member 230 may be interposed between the two or more fixing members 250. For example, as shown in FIG. 3, one mesh member 230 may be interposed between the two fixing members 250 to fix the position of the mesh member 230.

Figure 5:
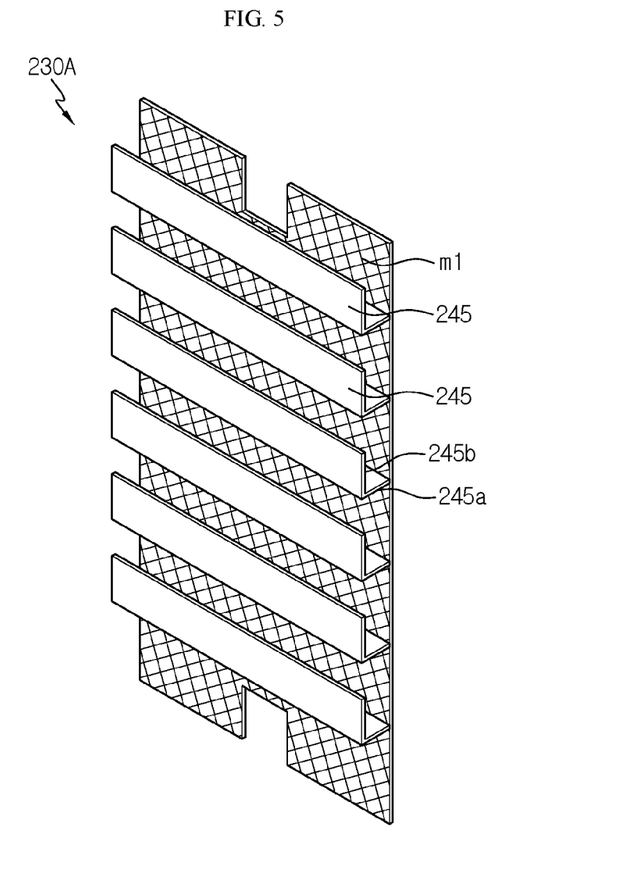
FIG. 5 is a perspective view schematically showing a mesh member, which is a partial configuration of a battery module according to another embodiment of the present disclosure.

FIG. 5 is a perspective view schematically showing a mesh member, which is a partial configuration of a battery module according to another embodiment of the present disclosure.

Referring to FIG. 5 together with FIG. 3, a mesh member 230A of the battery module according to another embodiment of FIG. 5 is the same as the mesh member 230 of FIG. 3 in the remaining configurations except that the mesh member 230A further includes a plurality of stoppers 245 when compared to the mesh member 230 of FIG. 3.

The stopper 245 may be provided on an outer surface of the mesh member 230A in a direction opposite to a direction in which the sealing member 240 is located. When the generated carbonization layer (241 of FIG. 4) of the sealing member 240 penetrates a mesh structure ml of the mesh member 230A, the stopper 245 may be configured to stop the carbonization layer from moving in a direction in which the carbonization layer penetrates more than a predetermined distance.

For example, the stopper 245 may have an 'L' shape. That is, the stopper 245 may include a lower portion 245a connected to one surface of the mesh member 230A in an outer direction and a rear portion 245b extending upward from an end portion of the lower portion 245a in the outer direction. For example, as shown in FIG. 5, six stoppers 245 may be provided on the outer surface of the mesh member 230A.

Accordingly, according to this configuration of the present disclosure, when the generated carbonization layer of the sealing member 240 penetrates the mesh structure ml, the mesh member 230A includes the stopper 245 configured to prevent the carbonization layer from moving in a direction in Which the carbonization layer penetrates more than a predetermined distance, thereby preventing the carbonization layer of the sealing member 240 from penetrating the mesh structure ml and being separated therefrom. Accordingly, it is possible to increase reliability of the sealing member 240 completely sealing the mesh member 230A. Ultimately, it is possible to increase the safely of the battery module 200.

Figure 6:
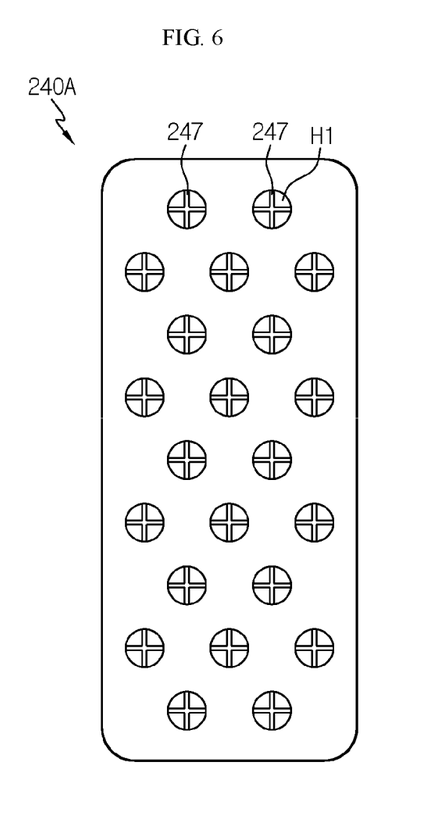
FIG. 6 is a front view schematically showing a part of a sealing member of a battery module according to another embodiment of the present disclosure.

FIG. 6 is a front view schematically showing a part, of a sealing member of a battery module according to another embodiment of the present disclosure.

Referring to FIG. 6, a sealing member 240A of the battery module according to another embodiment of FIG. 6 is different from the sealing member 240 of FIG. 3 in that the sealing member 240A further includes a core unit 247 when compared to the sealing member 240. However, the remaining configurations of the sealing member 240A of FIG. 6 may be the same as those of the sealing member 240 of FIG. 3.

The core unit 247 may be located in each of the plurality of vent holes H1. The core unit 247 may have a shape connected to a part of the vent hole H1. As shown in FIG. 6, the core unit 247 may have a cross shape in a front surface extending in a vertical direction and left and right direction. The core unit 247 may be configured to be connected to an upper inner surface, a lower inner surface, a left inner surface, and a right inner surface of the vent hole H1. The core unit 247 may be configured to expand a volume at more than a predetermined temperature to seal the vent hole H1 and a mesh hole of the mesh member 230.

Accordingly, according to this configuration of the present disclosure, the discharge member 260 includes the core unit 247 positioned in each of the plurality of vent holes H1 and expanding a volume at more than a predetermined temperature to seal the vent hole H1 and the mesh hole of the mesh member 230, and thus the sealing member 240A may more quickly perform the sealing of the vent hole H1 at more than a predetermined temperature. In addition, the core unit 247 may help to achieve more complete sealing of the vent hole H1.

Figure 7:
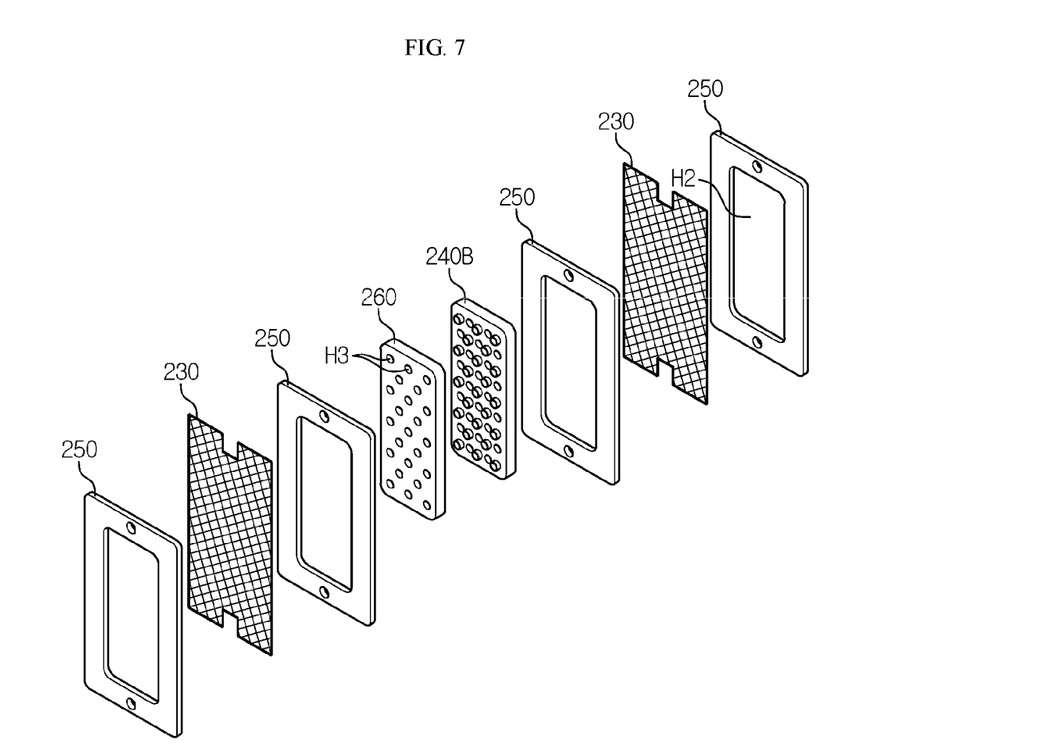
FIG. 7 is an exploded perspective view schematically showing some configurations of a battery module according to another embodiment of the present disclosure.
Figure 8:
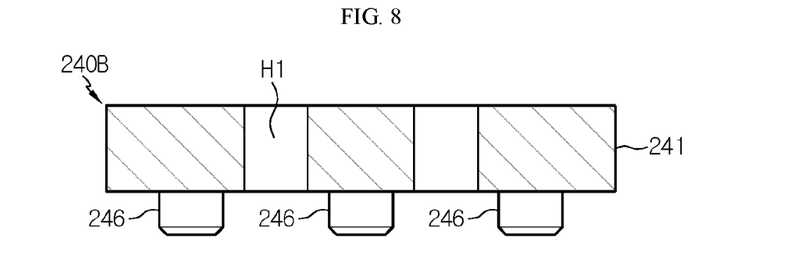
FIG. 8 is a horizontal cross-sectional view schematically showing a sealing member of FIG. 7 that is cut in a horizontal direction.
Figure 9:
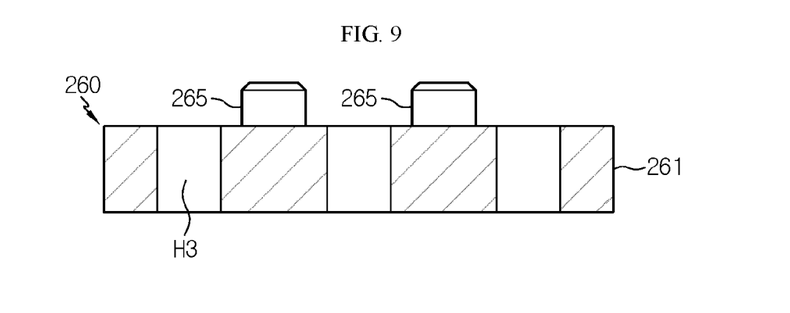
FIG. 9 is a horizontal cross-sectional view schematically showing a discharge member of FIG. 7 that is cut in the horizontal direction.

FIG. 7 is an exploded perspective view schematically showing some configurations of a battery module according to another embodiment of the present disclosure. FIG. 8 is a horizontal cross-sectional view schematically showing a sealing member of FIG. 7 that is cut in a horizontal direction. FIG. 9 is a horizontal cross-sectional view schematically showing a discharge member of FIG. 7 that is cut in the horizontal direction.

Referring to FIGS. 7 to 9, the battery module 200 according to another embodiment of the present disclosure may further include the discharge member 260 including a plurality of discharge holes H3. The discharge member 260 may be provided outside a sealing member 240B. The discharge member 260 may be spaced apart from the sealing member 240B by a predetermined distance. The plurality of discharge holes H3 may be configured to discharge a high temperature gas formed due to a fire or thermal runaway of the cell assembly 100 to the outside. At this time, each of the discharge member 260 and the sealing member 240B may expand a volume at more than a predetermined temperature, so that the discharge hole H3 and the vent hole H1 may be spaced apart from each other by a distance to seal each other.

A pillar portion 265 protruding in an outward direction may be provided on an outer surface of the discharge member 260. The pillar portion 265 may be configured to expand a volume at more than a predetermined temperature to seal each of the plurality of vent holes of the sealing member 240B. For example, at least a part of the discharge member 260 may be a material of, for example, the FS1000 product of Saint-Gobain. Alternatively, the discharge member 260 may include a graphite flake that expands a volume at a predetermined temperature.

For example, as shown in FIGS. 7 and 9, the discharge member 260 may include a plurality of pillar portions 265 as many as the number of vent holes H1 of the sealing member 240B. The plurality of pillar portions 265 may be respectively formed at positions facing the plurality of vent holes H1 in a front and rear direction.

In addition, the sealing member 240B of FIG. 7 may further include a plurality of insertion portions 246 as compared to the sealing member 240 of FIG. 3. The plurality of insertion portions 246 may be formed on one surface of the sealing member 240B facing the discharge member 260. The insertion part 246 has a pillar structure that expands a volume at more than a predetermined distance and protrudes toward each of the plurality of discharge holes H3 to seal each of the plurality of discharge holes H3 of the discharge member 260. The plurality of insertion portions 246 may be respectively formed at positions corresponding to the plurality of discharge holes H3 of the sealing member 240B.

Therefore, according to this configuration of the present disclosure, the battery module of the present disclosure further includes the discharge member 260 provided outside the discharge member 240B, spaced apart from the discharge member 240B by a predetermined distance, and including the plurality of discharge holes H3 to discharge the gas to the outside, and includes the pillar portion 265 that expands a volume at more than a predetermined temperature and protrudes in the outer direction to seal each of the plurality of vent holes H1 of the sealing member 240B on the outer surface of the discharge member 240B, and thus the discharge member 260 may effectively seal the plurality of vent holes H1 of the sealing member 240B, thereby preventing external air from being introduced into the vent hole H1 of the sealing member 240B.

Accordingly, external air is no longer introduced into the module housing 220, and thus the module housing 220 sealed against from the outside may prevent a fire of the cell assembly 100 from further spreading, and may ultimately induce the fire to naturally extinguish.

In addition, the sealing member 240B includes the plurality of insertion portions 246 to seal each of the plurality of discharge holes H3 formed in the discharge member 260 at more than a predetermined temperature, and thus external air may not be introduced into the discharge hole H3 of the discharge member 260 so that the external air may be no longer introduced into the module housing 220. Accordingly, the module housing 220 sealed against the outside may prevent the fire of the cell assembly 100 from further spreading and may ultimately induce the fire to naturally extinguish.

Figure 10:
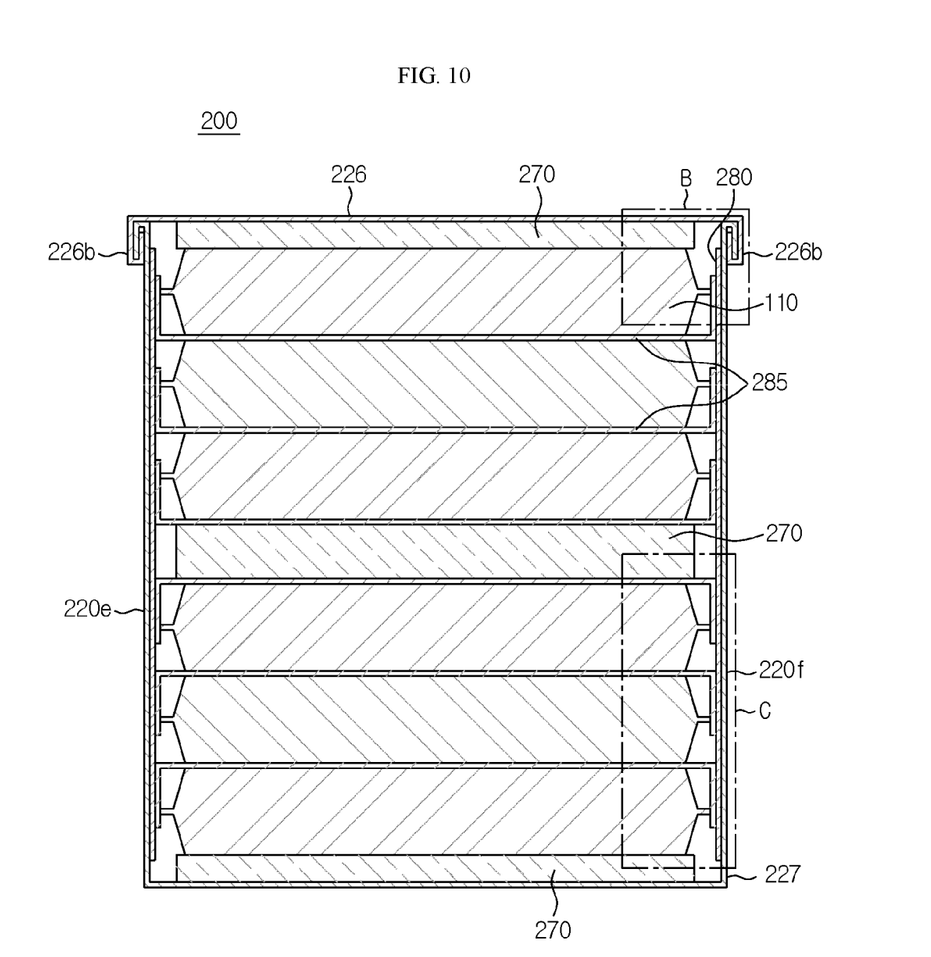
FIG. 10 is a schematic cross-sectional view of a battery module taken along line 10-10 of FIG. 1.

FIG. 10 is a schematic cross-sectional view of a battery module taken along line 10-10 of FIG. 1.

Again, referring to FIG. 10 together with FIG. 2, at least two battery cells 110 of the cell assembly 100 may be stacked in one direction. For example, as shown in FIG. 2, six battery cells 110 may be stacked in a vertical direction and accommodated within the module housing 220. The cell assembly 100 may further include an elastic member 270 configured to buffer a volume change of the battery cell 110 between the at least two stacked battery cells 110.

The elastic member 270 may be compressed when gas is generated in the at least two battery cells 110 to expand. Thereafter, when the gas is discharged from the at least two battery cells 110, the elastic member 270 may return to its original shape and apply pressure (an elastic force) to the at least two battery cells 110. Accordingly, the elastic member 270 may help the gas to be discharged to the outside from each of the at least two battery cells 110 provided in the cell assembly 100.

Therefore, according to this configuration of the present disclosure, the cell assembly 100 includes the elastic member 270 configured to buffer the volume change of the battery cell 110 between the at least two stacked battery cells 110, and thus, when a fire or thermal runaway occurs in the cell assembly 100, gas may be quickly discharged to the outside of the module housing 220 by helping the gas discharge from the at least two battery cells 110. Accordingly, the battery module 200 of the present disclosure may rapidly discharge the high temperature gas to prevent the internal temperature of the module housing 220 from rapidly rising, thereby preventing a fire or thermal runaway of the adjacent battery cell 100 from spreading.

Figure 11:
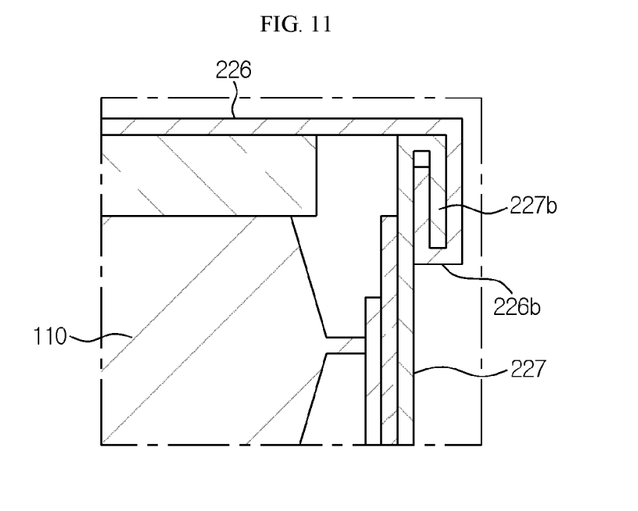
FIG. 11 is a partially enlarged cross-sectional view schematically showing a region B of FIG. 10.

FIG. 11 is a partially enlarged cross-sectional view schematically showing a region B of FIG. 10.

Referring to FIG. 11 together with FIGS. 2 and 10, the module housing 220 may include an upper plate 226 and a lower case 227. Specifically, the upper plate 226 may include a bent portion 226b in which an outer peripheral portion is bent at least two times in a clockwise or counterclockwise direction. In addition, the lower case 227 may have a box shape with an open top.

In addition, an upper end portion of the box shape of the lower case 227 may be coupled to the upper plate 226. The upper end portion of the box shape may have a structure 227b bent at least two times so as to correspond to an outer surface of the bent portion 226b of the upper plate 226. The upper plate 226 and the lower case 227 are not limited only to such a bent coupling structure, for example, the upper plate 226 and the lower case 227 may be coupled in a seaming structure, a clamping structure, or a hemming structure.

The module housing 220 may further include a sealing member (not shown) interposed between the bent portion 226b and an outer peripheral portion of the lower case 227 bent to correspond to the outer surface of the bent portion 226b. The sealing member may be, for example, a gasket including a silicon material.

Accordingly, according to this configuration of the present disclosure, the module housing 220 includes the upper plate 226 including the bent portion 226b in which the outer peripheral portion is bent at least two times, and the lower case 227 having the box shape with the open top, the upper end portion coupled to the upper plate 226, and the upper end portion having the structure 227b bent at least two times so as to correspond to the outer surface of the bent portion 226h, thereby achieving a tightly sealed structure between the upper plate 226 and the lower case 227 of the module housing 220. Accordingly, the battery module does not leak out a high temperature gas generated therein, thereby increasing user safety.

Figure 12:
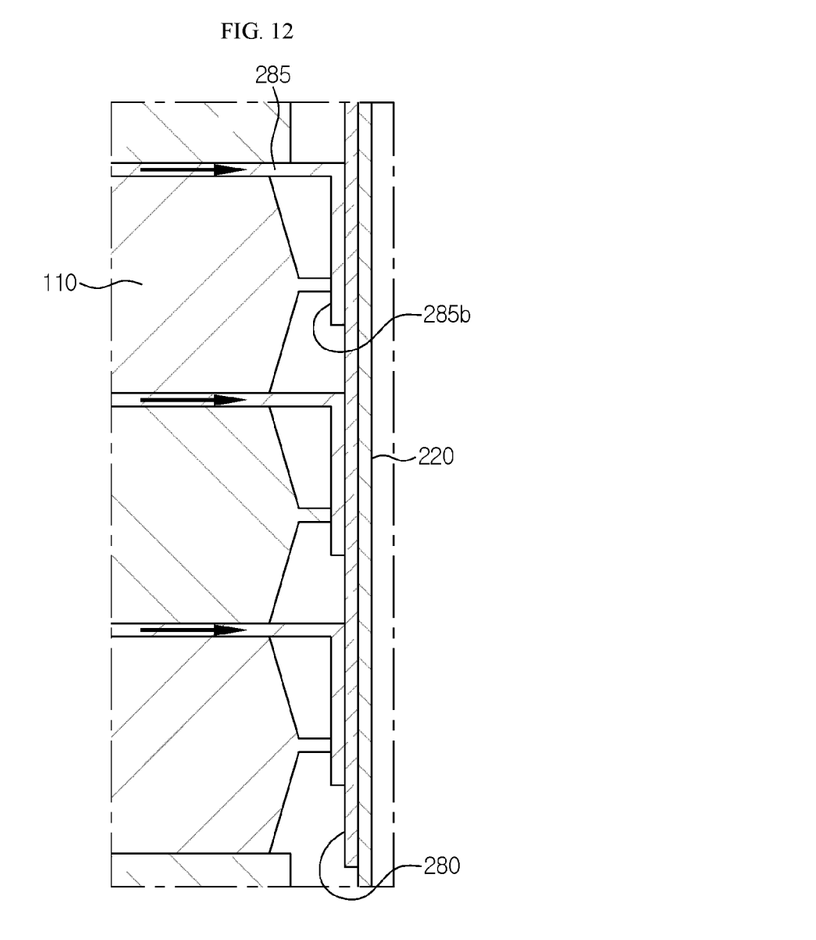
FIG. 12 is a partially enlarged cross-sectional view schematically showing a region C of FIG. 10.

FIG. 12 is a partially enlarged cross-sectional view schematically showing a region C of FIG. 10.

Referring back to FIG. 12 together with FIG. 10, the battery module 200 of the present disclosure may further include a heat transfer sheet 280 and a cooling fin 285. The heat transfer sheet 280 may be configured to be positioned in close contact with the inner surface of the module housing 220. The heat transfer sheet 280 may be provided on each of a left inner surface and a right inner surface of the module housing 220.

The cooling fin 285 may have a plate shape. The plate shape may have a size corresponding to one side of the battery cell 110. A part of the cooling fin 285 may be interposed between the at least two battery cells 110. The cooling fin 285 may have a structure 285h in which an outer peripheral portion is bent in one direction. Through the bent structure 285b, the outer peripheral portion of the cooling fin 285 may be configured to contact the heat transfer sheet 280.

Therefore, according to this configuration of the present disclosure, the battery module further includes the heat transfer sheet 280 configured to be positioned in close contact with the inner surface of the module housing 220, and the cooling fins 285 having the plate shape, interposed between the at least two battery cells 110, and having the outer peripheral portion bent in one direction to be in close contact with the heat transfer sheet 280, and thus generated heat may be effectively transferred to the module housing 220 when the cell assembly 100 is charged and discharged. Accordingly, it is possible to increase the cooling efficiency of the battery module 200.

Figure 13:
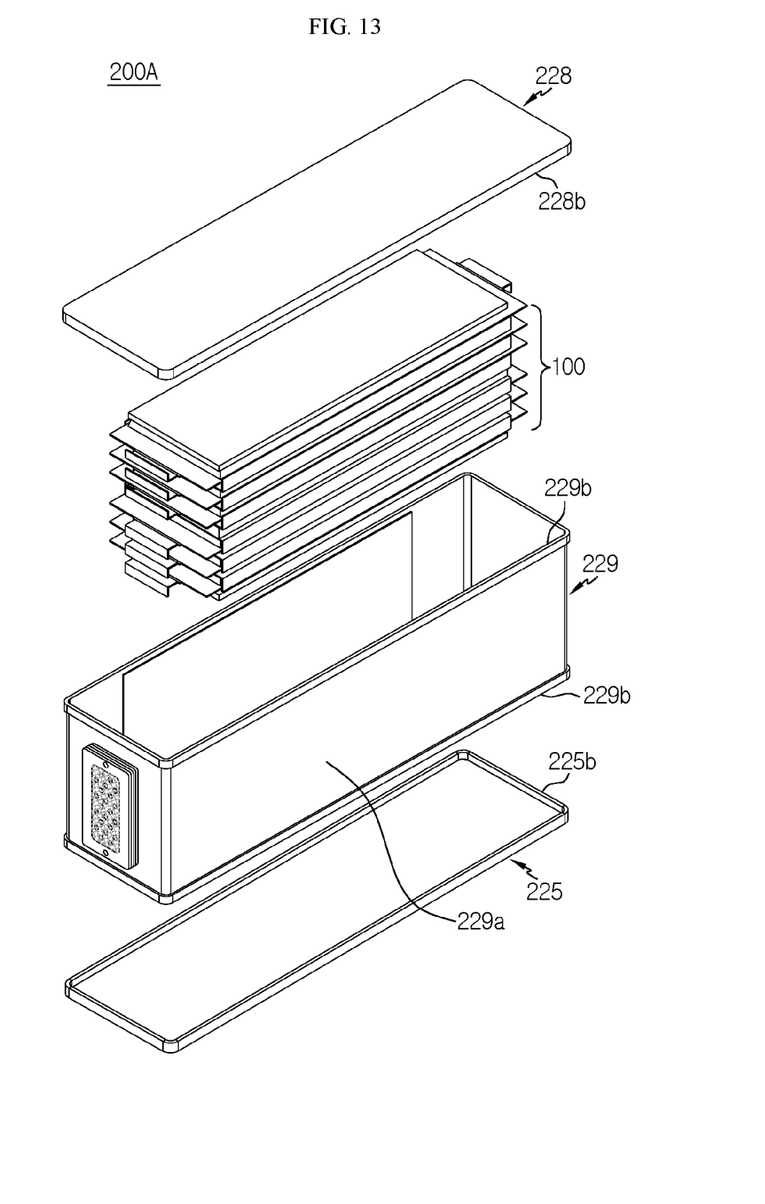
FIG. 13 is an exploded perspective view schematically showing some configurations of a battery module according to another embodiment of the present disclosure.

FIG. 13 is an exploded perspective view schematically showing some configurations of a battery module according to another embodiment of the present disclosure.

Referring to FIG. 13, the module housing 220 of a battery module 200A according to another embodiment of the present disclosure may include an intermediate case 229, a top plate 228, and a lower plate 225.

The intermediate case 229 may have a sidewall 229a extending in a horizontal direction so that upper and lower portions are opened and an inner space is formed. A coupling portion 229b bent at least two times in an outward direction may be provided on each of upper and lower ends of the sidewall 229a. Here, the 'outward direction' may mean a direction opposite to a direction in which the cell assembly 100 is located.

In addition, the top plate 228 may have a plate shape configured to be mounted on an upper portion of the intermediate case 229. The top plate 228 may have a structure 228b that is bent at least two times so that an outer peripheral portion corresponds to an outer surface of the coupling portion 229b. The coupling portion 229b formed on an upper end portion of the intermediate case 229 and the bent structure 228b are coupled to each other, thereby sealing between the top plate 228 and the intermediate case 229.

Moreover, the lower plate 225 may have a plate shape configured to be positioned on a lower portion of the intermediate case 229. The lower plate 225 may have a structure 225b that is bent at least two times so that the outer peripheral portion corresponds to the outer surface of the coupling portion 229b. The coupling portion 229b formed on the lower end portion of the intermediate case 229 and the bent structure 225b may seal between the lower plate 225 and the intermediate case 229.

Accordingly, according to this configuration of the present disclosure, the top plate 228 and the lower plate 225 respectively have the bent structures 228b and 225b configured to be coupled to the coupling portion 229b of the intermediate case 229, and thus the module housing 220 may have a dense sealing structure. Accordingly, the battery module 200A does not leak out a high temperature gas generated therein, thereby improving user safety.

In addition, a battery pack (not shown) according to the present disclosure may include at least one battery module 200. Moreover, in addition to the battery module 200, the battery pack according to the present disclosure may further include a pack case accommodating the battery module 200, various devices for controlling charging and discharging of the battery, module 200, such as a BMS, a current sensor, a fuse, etc.

The battery pack according to the present disclosure may be applied to a vehicle such as an electric vehicle or a hybrid vehicle. That is, the vehicle according to the present disclosure may include the battery pack according to the present disclosure.

Meanwhile, in the present specification, although the terms indicating directions such as up, down, left, right, front, and back are used, it is apparent to those skilled in the art that these terms are for convenience of explanation only and vary depending on the position of a target object or the position of an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

[Description of Reference Numerals]

| | |
|---|---|
| 200: battery module | |
| 100: cell assembly | 110: battery cell |
| 111: electrode lead | 220: module housing |
| 230: mesh member | 240: sealing member |
| H1: vent hole | H4: circulation hole |
| 250: fixing member | |
| H2: opening hole | 245: stopper |
| 247: core unit | 260: discharge member |
| H3: discharge hole | 265: pillar portion |
| 270: elastic member | 280: heat transfer sheet |
| 285: cooling fin | 226: upper plate |
| 227: lower case | 228: top plate |
| 229: intermediate case | 225: lower plate |

INDUSTRIAL APPLICABILITY

The present disclosure relates to a battery module. Further, the present disclosure is applicable to an industry related to a battery pack including the battery module or a vehicle.

What is claimed is:

1. A battery module comprising:
a cell assembly comprising at least two battery cells;
a module housing comprising an inner space accommodating the cell assembly, and comprising a circulation hole so that the inner space is connected to an outside;
a mesh member having a mesh structure and provided in the circulation hole of the module housing;
a sealing layer facing the mesh member and configured to expand a volume at a temperature higher than a predetermined temperature to seal a mesh hole of the mesh member; and
a discharge member provided outside the sealing layer, spaced apart from the sealing layer by a predetermined distance in a first direction, and comprising a plurality of discharge holes to discharge the gas to the outside,
wherein the sealing layer is a freestanding layer stacked on the mesh member in the first direction,
wherein the sealing layer comprises a plurality of vent holes to discharge a gas generated inside the module housing to the outside,
wherein a pillar portion protruding in an outward direction is provided on an outer surface of the discharge member, the pillar portion being configured to expand a volume at a temperature higher than a predetermined temperature to seal the plurality of vent holes of the sealing layer, and
wherein the discharge member is between the sealing layer and the mesh member in the first direction.

2. The battery module of claim 1, wherein the module housing comprises at least two plates configured to fix the mesh member to the circulation hole, and
wherein the mesh member is interposed between the at least two plates in the first direction.

3. The battery module of claim 2, wherein each of the at least two plates comprises an opening hole configured to insert the sealing layer therein.

4. The battery module of claim 1, wherein the sealing layer is configured to generate a carbonization layer that expands a volume at a temperature higher than a predetermined temperature, and
wherein the mesh member comprises a stopper configured to stop the carbonization layer from moving in a direction toward the mesh member.

5. The battery module of claim 1, wherein the sealing layer comprises a core unit positioned in each of the plurality of vent holes and configured to expand a volume at a temperature higher than a predetermined temperature to seal the vent hole and the mesh member.

6. The battery module of claim 1, wherein the at least two battery cells of the cell assembly are stacked in the first direction, and
wherein the cell assembly comprises an elastic member provided between the at least two stacked battery cells and the module housing to buffer a volume change of the cell assembly.

7. A battery pack comprising at least one battery module according to claim 1.

8. A vehicle comprising a battery pack according to claim 7.

* * * * *